Oct. 14, 1930.  J. E. RUSSELL  1,778,689
MILK STRAINER
Filed June 4, 1929   2 Sheets-Sheet 1
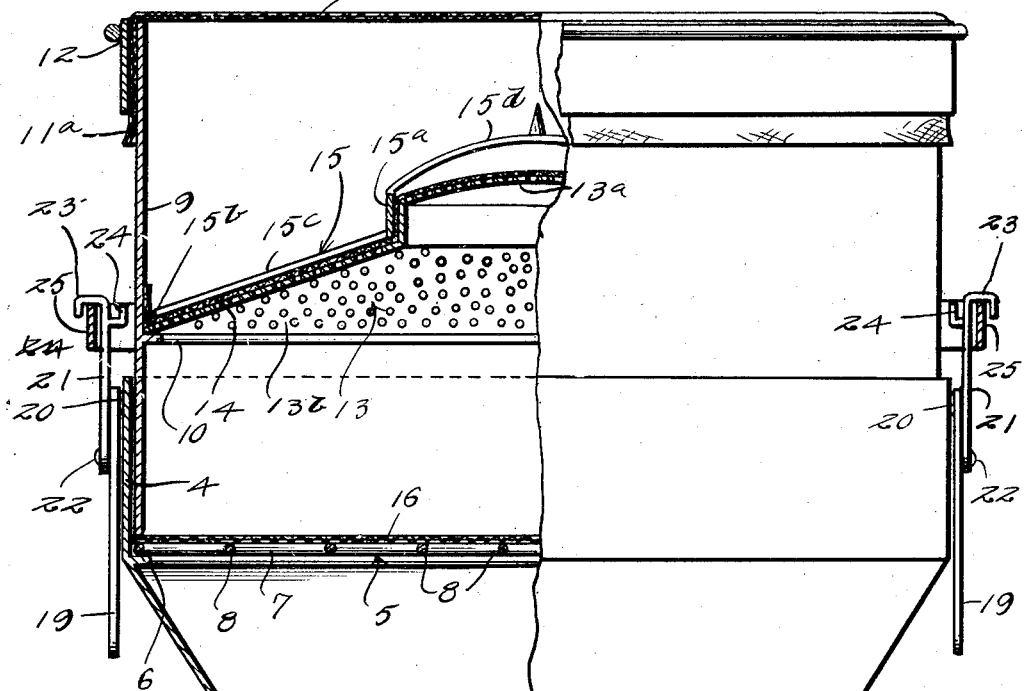
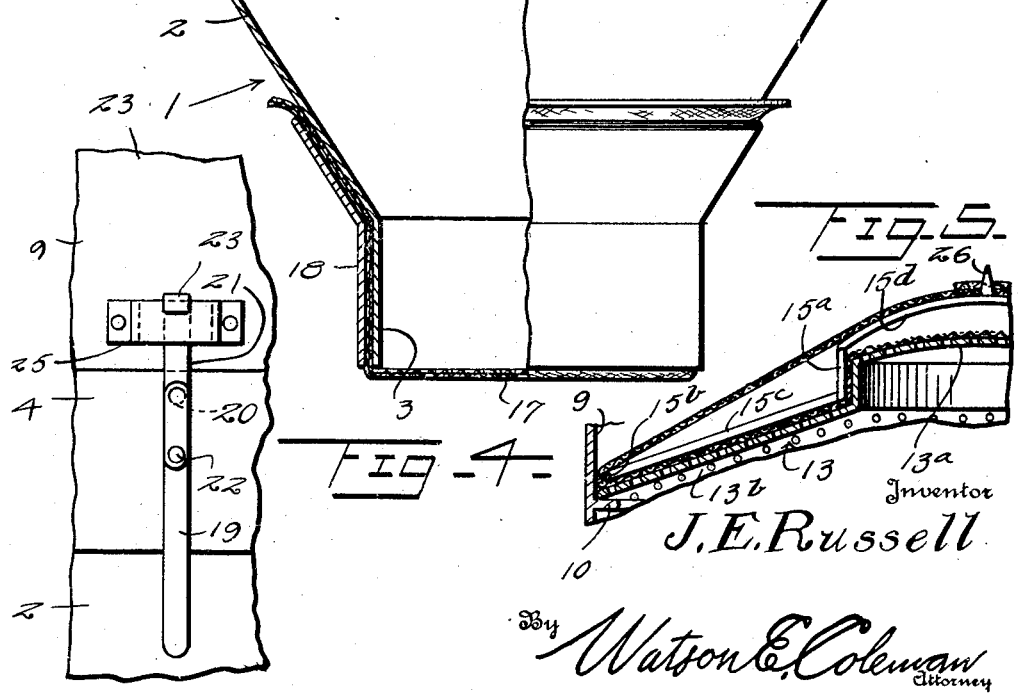
Inventor
J. E. Russell
By Watson E. Coleman
Attorney Oct. 14, 1930.     J. E. RUSSELL     1,778,689
MILK STRAINER
Filed June 4, 1929     2 Sheets-Sheet 2
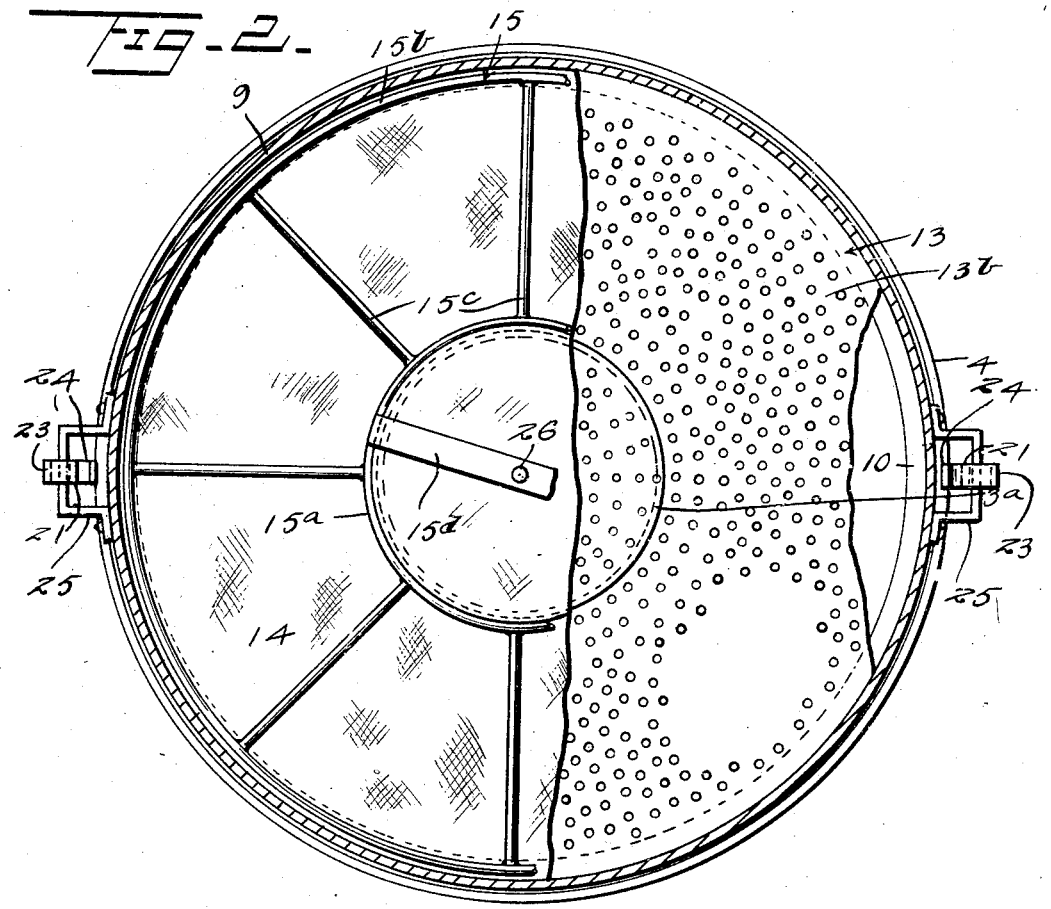
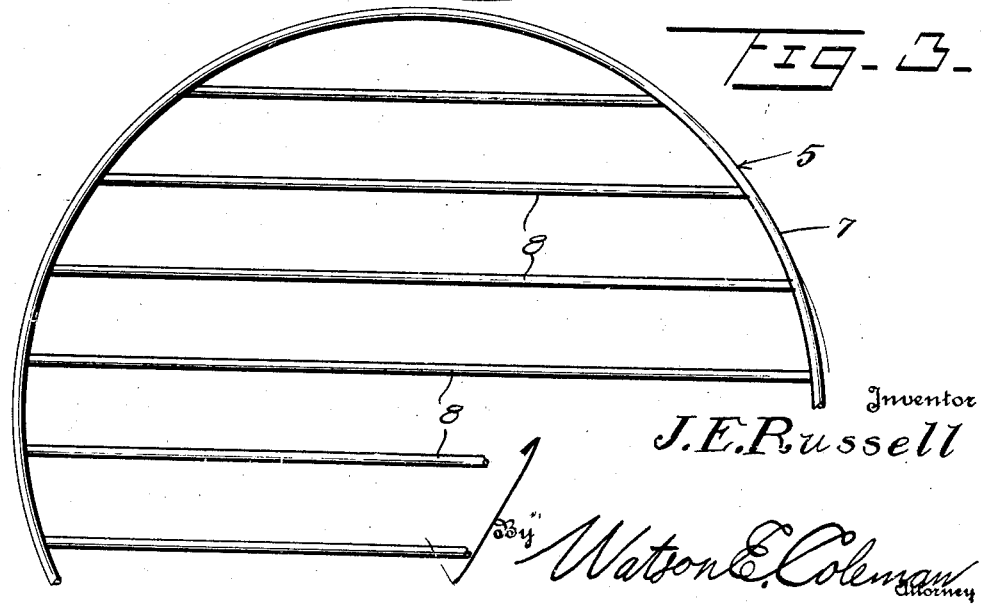
Inventor
J. E. Russell
By Watson E. Coleman
Attorney Patented Oct. 14, 1930

1,778,689

UNITED STATES PATENT OFFICE

JAMES E. RUSSELL, OF SHERIDAN, WYOMING

MILK STRAINER

Application filed June 4, 1929. Serial No. 368,277.

This invention relates to milk strainers, and has for one of its objects to provide a novel device of this character which shall be so highly efficient as to remove all dirt from the milk, through which the milk will readily flow without the aid of pressure, which may be easily maintained in highly sanitary condition, and which shall be adapted to be used in connection with any standard size milk can.

The invention has for a further object to provide a milk strainer of the character stated which shall be simple and durable and capable of being manufactured and sold at a comparatively low cost.

With the foregoing and other objects in view, the nature of which will appear as the description proceeds, the invention consists in the construction, combination and arrangement of parts, hereinafter fully described and claimed and illustrated in the accompanying drawings, wherein:—

Figure 1 is a view partly in vertical section and partly in elevation of a milk strainer constructed in accordance with my invention;

Figure 2 is a view partly in horizontal section and partly in top plan of the milk strainer Figure 3 is a top plan view of a fragmentary portion of one of the strainer cloth supporting elements;

Figure 4 is a view in side elevation of a fragmentary portion of the strainer illustrating the means by which the sections of the strainer may be moved one into the other, or separated, and Figure 5 is a sectional view illustrating a slightly modified form of one of the strainer elements of the device.

The milk strainer comprises a body or funnel 1 adapted to be inserted in the neck of a milk can and consisting of a frusto-conical portion 2, an annular member or flange 3 at the lower end of said portion, and an annular member or flange 4 at the upper end of said portion. A strainer element supporting frame 5 is arranged within the upper end portion of the body 1, and rests upon an annular shoulder 6 formed at the juncture of the body portions 2 and 4. The frame 5 consists of a ring 7 and bars 8 arranged in parallel relation within the ring. A strainer element carrying cylinder 9, fully open at its ends, has its lower end portion arranged within the body portion 4, and rests upon the frame 5, the cylinder being provided intermediate its ends with an inner annular shoulder 10.

A strainer element 11, which may consist of one or more cloths extends across the upper end of the cylinder 9, and has its edge bent downwardly into contact with the outer surface of the cylinder, as shown at $11^a$. A clamping ring 12 surrounds the downwardly extending edge of the strainer element 11 and binds it against the cylinder 9 so as to firmly but removably secure the strainer element in place.

A strainer element 13 made from metal and consisting of a substantially cylindrical hollow portion $13^a$ and a frusto-conical shallow portion $13^b$, is arranged within the cylinder 9 with the lower edge of its portion $13^b$ resting upon the shoulder 10. The portion $13^a$ extends upwardly from the inner edge of the portion $13^b$ and the upper wall thereof has a convex upper surface, and both of these portions are perforated.

A strainer element 14, which may be made from any suitable filtering material or the best grade of cheesecloth, is arranged upon the strainer element 13. A retainer 15 is provided for the strainer element 14, and it rests upon the strainer element and consists of an inner ring $15^a$, an outer ring $15^b$, bars $15^c$ connecting the rings, and a handle $15^d$ secured to the ring $15^a$. The retainer 15 is substantially similar in cross sectional formation to the strainer element 13, and firmly but removably holds the strainer element 14 in place. The handle $15^d$ extends across the strainer part $13^a$ and is spaced therefrom to permit it to be readily grasped.

A strainer element 16, which may consist of one or more cloths, is arranged upon the frame 5 with its edges held against the frame by the cylinder 9.

A strainer element 17, which may also consist of one or more cloths extends across the lower end of the body portion 3 and has its edges bent upwardly into contact with the outer surfaces of said part and lower section of the body portion 2. The strainer element 17 is secured in place by a clamp 18, which conforms cross sectionally to the body portions 2 and 3, and binds the edges of the strainer element against said portions.

In practice, the milk first passes through the strainer element 11, then through the strainer elements 14 and 13, then through the strainer element 16, and then through the strainer element 17, with the result that all dirt is removed therefrom. The strainer element 13 functions as a milk distributor in that it causes the milk to spread over the entire interior of the device, and furthermore, it causes the milk to fall gently on to the strainer cloths 16.

The clamps 12 and 18 permit the strainer elements 11 and 17 to be readily removed from the body portion 1 and cylinder 9, and the retainer 15 permits the strainer element 14 to be readily removed from the strainer element 13, in order that the strainer elements may be easily and quickly washed or new ones easily and quickly substituted therefor.

A means is provided for forcing the cylinder 9 into and out of the body 1, and after the withdrawal of the cylinder from the body, the strainer element may be removed for the purpose of washing the same or for the purpose of substituting a new one therefor. This means comprises levers 19 pivoted at their upper ends, as at 20, to diametrically opposite points of the body 1, and the links 21 pivotally connected at the lower ends, as at 22, to the levers at points below the pivot ends of the levers.

The links 21 are provided at their upper ends with downwardly directed outer hooks 23 and upwardly directed inner hooks 24. The hooks 23 engage the upper edges of the handles 25, which are carried by the cylinder 9, while the cylinder is being drawn into the body 1, and the hooks 24 engage the lower edges of the handles while the cylinder is being forced out of the body 1. The handles 25 will permit the device to be readily moved from camp to camp.

The handle 15ᵈ of the retainer 15 is provided with an upstanding prong or peg 26, and if desired, the edges of the strainer element 14 may be engaged with the prong or peg, as shown in Figure 5. When this is done, a sack-like filtering element is provided which functions in an ideal manner. To provide the sack-like filtering element, it is only necessary to substitute a larger cloth for the cloth 14, and it is to be noted that this cloth may be easily changed. If desired, sixteen filtering elements may be used. When it is desired to use this number three double ply cloths are arranged across the lower end of the body 1, three double ply cloths are arranged across the frame 5, one double ply cloth is arranged across the strainer element 13 and one double ply cloth is arranged across the upper end of the cylinder 9. In this connection it is to be noted that any desired or required number of strainer cloths may be employed.

It should be apparent from the foregoing description, taken in connection with the accompanying drawing, that the strainer is of such high efficiency that it is especially adapted for preparing milk for use by infants, that it will not clog, and that the several parts thereof are so assembled that they may be easily and quickly separated for cleaning to the end that the device may be maintained in the highly sanitary condition required by milk inspectors.

While I have described the principle of the invention together with the structure which I now consider the preferred embodiment thereof, it is to be understood that the structure shown is merely illustrative and that such changes may be made, when desired, as fall within the scope of the invention as claimed.

I claim:—

1. A strainer, comprising a body, a strainer element extending across the lower end of the body, means for removably securing the strainer element to the body, a frame extending across the body above said strainer element, a strainer element carried by the frame, a spreader arranged above said second strainer element, a strainer element arranged upon the spreader, a cylinder having its lower end portion arranged within the body and removably securing the frame in place, means removably supporting the spreader within the cylinder, a strainer element extending across the upper end of the cylinder, and means removably securing said last strainer element in place.

2. A strainer comprising a substantially conical member, an arcuate member secured to the upper end of said first member and provided with a peg, and a strainer element extending across and contacting with the under side of the conical member and extending across and spaced from the upper side of the conical member and having its edges secured to the peg.

3. A strainer comprising a carrying member, upper and lower straining elements extending across said member, and a combined spreading and straining element arranged within and extending across said member between said first straining elements, said combined spreading and straining element having a cylindrical central portion provided with an upper wall having perforations and a convex upper surface, and a frusto-conical shallow outer perforated portion extending from the lower edge of said cylindrical portion to the wall of said member.

4. A strainer including a perforated member having a cylindrical central portion and a downwardly and outwardly inclined outer portion, a strainer element positioned upon said member, a retainer resting upon said strainer element, and a member secured to the upper end of said retainer, said strainer element overlying the retainer and having its edges secured to said member.

In testimony whereof I hereunto affix my signature.

JAMES E. RUSSELL.